United States Patent
Hart et al.

(10) Patent No.: US 11,885,573 B2
(45) Date of Patent: *Jan. 30, 2024

(54) AIRCRAFT HEAT EXCHANGER PANEL ATTACHMENT

(71) Applicant: RTX Corporation, Farmington, CT (US)

(72) Inventors: Patrick M. Hart, Newington, CT (US); William P. Stillman, Westminster, CO (US); Russell J. Bergman, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,606

(22) Filed: Jan. 9, 2023

(65) Prior Publication Data

US 2023/0160641 A1 May 25, 2023

Related U.S. Application Data

(62) Division of application No. 17/139,180, filed on Dec. 31, 2020, now Pat. No. 11,585,605.

(Continued)

(51) Int. Cl.
*F28D 9/02* (2006.01)
*F28F 3/10* (2006.01)
*F28D 21/00* (2006.01)

(52) U.S. Cl.
CPC .................. *F28D 9/02* (2013.01); *F28F 3/10* (2013.01); *F28D 2021/0026* (2013.01); *F28F 2215/00* (2013.01); *F28F 2275/14* (2013.01)

(58) Field of Classification Search
CPC ...... F28D 9/02; F28D 9/06; F28D 2021/0026; F28D 2021/0021; F28F 3/10; F28F 3/12; F28F 9/262; F28F 2215/00; F28F 2275/14

See application file for complete search history.

(56) References Cited

U.S. PATENT DOCUMENTS

| 1,311,549 | A | 7/1919 | Bowman |
| 4,137,705 | A | 2/1979 | Anderson et al. |

(Continued)

FOREIGN PATENT DOCUMENTS

| CN | 106168452 B | 8/2018 |
| CN | 108869044 A | 11/2018 |

(Continued)

OTHER PUBLICATIONS

Chris Wiegand et al., "F-35 Air Vehicle Technology Overview", Aviation Technology, Integration, and Operations Conference, Jun. 2018, American Institute of Aeronautics and Astronautics, Inc., Reston, Virginia.

(Continued)

*Primary Examiner* — Devon Russell

(74) *Attorney, Agent, or Firm* — Bachman & LaPointe, P.C.

(57) ABSTRACT

A heat exchanger for providing thermal energy transfer between a first flow along a first flowpath and a second flow along a second flowpath has at least one plate bank having a plurality of plates, each plate having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. An inlet manifold has a first face to which the plurality of plates are mounted along their respective proximal edges. An inlet plenum has at least one inlet port and at least one outlet port. An outlet plenum has at least one outlet port and at least one inlet port. The first flowpath passes from the at least one inlet port of the inlet plenum, through the at least one passageway of each of the plurality of plates, and through the at least one outlet port of the outlet plenum. For (Continued)

each plate, the manifold first face has a respective associated slot capturing a portion of the plate along the proximal edge thereof to prevent extraction of the plate normal to the manifold first face.

20 Claims, 13 Drawing Sheets

Related U.S. Application Data

(60) Provisional application No. 62/971,522, filed on Feb. 7, 2020.

(56) References Cited

U.S. PATENT DOCUMENTS

| | | |
|---|---|---|
| 4,438,809 A | 3/1984 | Papis |
| 4,520,868 A | 6/1985 | Grawey |
| 4,738,311 A | 4/1988 | Bleckman |
| 4,813,112 A | 3/1989 | Pilliez |
| 5,318,114 A | 6/1994 | Sasaki |
| 5,417,280 A | 5/1995 | Hayashi et al. |
| 5,443,116 A | 8/1995 | Hayashi et al. |
| 5,517,757 A | 5/1996 | Hayashi et al. |
| 5,531,268 A | 7/1996 | Hoshino et al. |
| 6,134,880 A | 10/2000 | Yoshinaka |
| 6,328,100 B1 | 12/2001 | Haussmann |
| 6,430,931 B1 | 8/2002 | Horner |
| 6,564,863 B1 | 5/2003 | Martins |
| 6,607,026 B1 | 8/2003 | Naji et al. |
| 6,945,320 B2 | 9/2005 | Harvard, Jr. et al. |
| 7,334,411 B2 | 2/2008 | Vandermolen |
| 7,669,645 B2 | 3/2010 | Nakamura |
| 7,784,528 B2 | 8/2010 | Ottow et al. |
| 7,861,512 B2 | 1/2011 | Olver et al. |
| 8,181,443 B2 | 5/2012 | Rago |
| 8,266,888 B2 | 9/2012 | Liu |
| 8,387,362 B2 | 3/2013 | Storage et al. |
| 8,438,835 B2 | 5/2013 | Perveiler et al. |
| 8,573,291 B2 | 11/2013 | Vick |
| 8,656,988 B1 | 2/2014 | Paul et al. |
| 8,689,547 B2 | 4/2014 | Burgers et al. |
| 8,770,269 B2 | 7/2014 | Scott |
| 8,784,047 B2 | 7/2014 | Elder |
| 9,200,855 B2 | 12/2015 | Kington et al. |
| 9,243,563 B2 | 1/2016 | Lo |
| 9,328,968 B2 | 5/2016 | Vanderwees |
| 9,341,119 B2 | 5/2016 | Rhoden |
| 9,377,250 B2 | 6/2016 | Landre |
| 9,732,702 B2 | 8/2017 | Ueda |
| 9,766,019 B2 | 9/2017 | Eleftheriou et al. |
| 9,771,867 B2 | 9/2017 | Karam et al. |
| 9,816,766 B2 | 11/2017 | Miller et al. |
| 9,835,043 B2 | 12/2017 | Kantany et al. |
| 9,851,159 B2 | 12/2017 | Cameron |
| 9,909,812 B2 | 3/2018 | Peskos et al. |
| 9,982,630 B2 | 5/2018 | Marini et al. |
| 10,041,741 B2 | 8/2018 | Turcotte et al. |
| 10,100,740 B2 | 10/2018 | Thomas |
| 10,125,684 B2 | 11/2018 | Yu |
| 10,175,003 B2 | 1/2019 | Sennoun et al. |
| 10,184,400 B2 | 1/2019 | Cerny et al. |
| 10,208,621 B2 | 2/2019 | Hoefler et al. |
| 10,222,142 B2 | 3/2019 | Alvarez et al. |
| 10,316,750 B2 | 6/2019 | Loebig et al. |
| 10,422,585 B2 | 9/2019 | Jensen et al. |
| 10,480,407 B2 | 11/2019 | Alecu |
| 10,830,540 B2 | 11/2020 | Sennoun et al. |
| 11,585,273 B2 | 2/2023 | Wiedenhoefer et al. |
| 2001/0018024 A1 | 8/2001 | Hyde et al. |
| 2004/0026072 A1 | 2/2004 | Yi et al. |
| 2004/0050531 A1 | 3/2004 | Horiuchi et al. |
| 2004/0111829 A1 | 6/2004 | Bruno et al. |
| 2006/0131009 A1 | 6/2006 | Nies |
| 2009/0169359 A1 | 7/2009 | Murphy et al. |
| 2010/0084120 A1 | 4/2010 | Yin et al. |
| 2010/0170262 A1 | 7/2010 | Kaslusky et al. |
| 2011/0088405 A1 | 4/2011 | Turco et al. |
| 2011/0146944 A1 | 6/2011 | Hand et al. |
| 2011/0168366 A1 | 7/2011 | Garret et al. |
| 2013/0199152 A1 | 8/2013 | Menheere et al. |
| 2014/0246179 A1 | 9/2014 | Vallee et al. |
| 2014/0318751 A1 | 10/2014 | Kinder et al. |
| 2015/0047818 A1 | 2/2015 | Peskos et al. |
| 2015/0047820 A1 | 2/2015 | Rhoden |
| 2016/0069266 A1 | 3/2016 | Murphy et al. |
| 2016/0123230 A1 | 5/2016 | Thomas |
| 2016/0177828 A1 | 6/2016 | Snyder et al. |
| 2016/0230669 A1 | 8/2016 | Selstad et al. |
| 2016/0265850 A1 | 9/2016 | Kupiszewski et al. |
| 2016/0362999 A1 | 12/2016 | Ho |
| 2017/0009703 A1 | 1/2017 | Moon et al. |
| 2017/0184024 A1 | 6/2017 | Sennoun |
| 2017/0363361 A1 | 12/2017 | Turney |
| 2018/0051935 A1 | 2/2018 | Roberge |
| 2018/0058472 A1 | 3/2018 | Tajiri et al. |
| 2018/0172368 A1 | 6/2018 | Kowalski et al. |
| 2018/0238238 A1 | 8/2018 | Luschek et al. |
| 2018/0238630 A1 | 8/2018 | Pollard et al. |
| 2018/0244127 A1 | 8/2018 | Sennoun et al. |
| 2018/0245853 A1 | 8/2018 | Sennoun et al. |
| 2018/0258859 A1 | 9/2018 | Suciu et al. |
| 2018/0292140 A1 | 10/2018 | Mayo et al. |
| 2018/0328285 A1 | 11/2018 | Tajiri et al. |
| 2019/0154345 A1 | 5/2019 | Martinez et al. |
| 2019/0170445 A1 | 6/2019 | McCaffrey |
| 2019/0170455 A1 | 6/2019 | McCaffrey |
| 2019/0204012 A1 | 7/2019 | Army et al. |
| 2019/0212074 A1 | 7/2019 | Lockwood et al. |
| 2019/0234690 A1 | 8/2019 | Sobolak et al. |
| 2019/0277571 A1 | 9/2019 | Disori et al. |
| 2019/0277579 A1 | 9/2019 | Disori et al. |
| 2019/0293365 A1 | 9/2019 | Disori et al. |
| 2019/0310030 A1 | 10/2019 | Disori et al. |
| 2019/0339012 A1 | 11/2019 | Disori et al. |
| 2020/0072559 A1 | 3/2020 | Sennoun et al. |
| 2020/0347737 A1 | 11/2020 | Bordoni |
| 2021/0207535 A1 | 7/2021 | Bergman et al. |
| 2021/0222624 A1 | 7/2021 | Wiedenhoefer et al. |
| 2021/0222962 A1 | 7/2021 | Wiedenhoefer et al. |
| 2021/0222963 A1 | 7/2021 | Bergman et al. |
| 2021/0285375 A1 | 9/2021 | Wiedenhoefer et al. |
| 2022/0373263 A1 | 11/2022 | Wiedenhoefer et al. |

FOREIGN PATENT DOCUMENTS

| | | |
|---|---|---|
| CN | 110553533 A | 12/2019 |
| DE | 9309822 U1 | 11/1994 |
| DE | 19515528 A1 | 10/1996 |
| DE | 102004058499 A1 | 6/2006 |
| DE | 102008051422 A1 | 4/2010 |
| EP | 0223995 B1 | 1/1990 |
| EP | 656517 A1 | 11/1994 |
| FR | 2770632 A1 | 5/1999 |
| FR | 3075870 A | 6/2019 |
| GB | 574450 A | 1/1946 |
| JP | 0961084 A | 3/1997 |
| JP | H0961084 A | 3/1997 |
| WO | 2016/096042 A1 | 6/2016 |
| WO | 2021/138307 A1 | 7/2021 |
| WO | 2021/146674 A1 | 7/2021 |

OTHER PUBLICATIONS

Jonathan Lowell, "Keeping Cool over Salt Lake", Aug. 25, 2019, US Air Force, Washington, DC, retrieved from internet Nov. 9, 2019 https://www.af.mil/News/Commentaries/Display/Article/1941943/keeping-cool-over-salt-lake/.

Sean Robert Nuzum, Thesis: "Aircraft Thermal Management using Liquefied Natural Gas", Apr. 27, 2016, Wright State University, Dayton, Ohio.

European Search Report and Opinion dated Oct. 20, 2021 for European Patent Application No. 20218011.3.

(56) References Cited

OTHER PUBLICATIONS

U.S. Office Action dated Nov. 9, 2021 for U.S. Appl. No. 17/139,174.
International Search Report and Written Opinion dated Mar. 31, 2021 for PCT/US21/13804.
European Search Report dated Feb. 7, 2022 for European Patent Application No. 21740964.8 (EP stage of PCT/US2021/013804-WO/2021/146674).
U.S. Office Action dated Dec. 13, 2021 for U.S. Appl. No. 17/124,551.
International Search Report and Written Opinion dated Mar. 19, 2021 for PCT/US20/67289.
European Search Report dated Nov. 25, 2021 for European Patent Application No. 20910078.3 (EP stage of PCT/US2020/067289-WO/2021/138307).
European Search Report dated Nov. 19, 2021 for European Patent Application No. 21191780.2 (EP stage of PCT/US2020/067289-WO/2021/138307).
Extended European Search Report dated Mar. 31, 2022 for European Patent Application No. 20910078.3 (EP stage bf PCT/US20/67289-WO/2021/138307).
Extended European Search Report dated Mar. 31, 2022 for European Patent Application No. 21191780.2 (EP divisional of PCT/US20/67289-WO/2021/138307).
U.S. Office Action dated Jun. 21, 2022 for U.S. Appl. No. 17/139,180.
U.S. Office Action dated Jul. 6, 2023 for U.S. Appl. No. 17/125,214 (published as 2021/0207535A1).
U.S. Office Action dated Aug. 1, 2023 for U.S. Appl. No. 18/100,130 (published as 2023/0160342A1).
European Search Report dated Aug. 4, 2023 for European Patent Application No. 23184866.4.

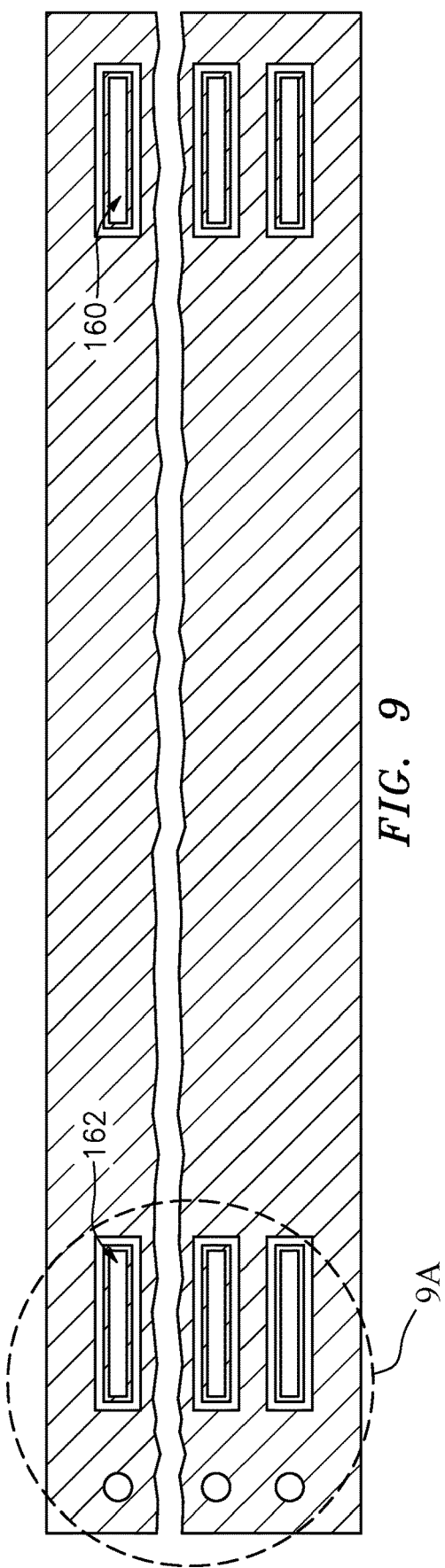
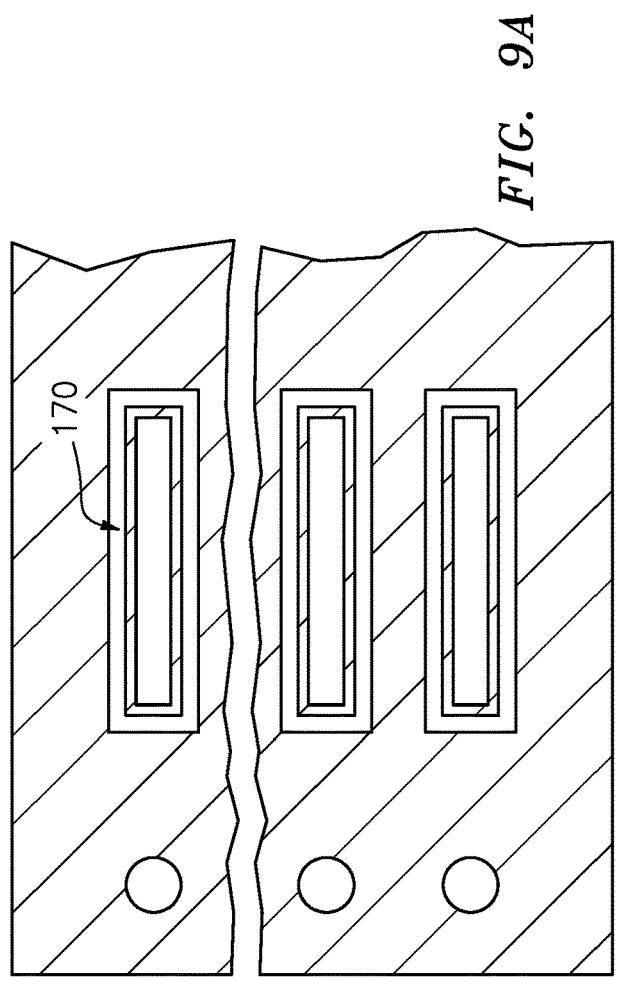

AIRCRAFT HEAT EXCHANGER PANEL ATTACHMENT

CROSS-REFERENCE TO RELATED APPLICATION

This is a divisional application of U.S. patent application Ser. No. 17/139,180, filed Dec. 31, 2020, and entitled "Aircraft Heat Exchanger Panel Attachment" which claims benefit of U.S. Patent Application No. 62/971,522, filed Feb. 7, 2020, and entitled an "Aircraft Heat Exchanger Panel Attachment", the disclosure of which is incorporated by reference herein in its entirety as if set forth at length.

BACKGROUND

The disclosure relates to gas turbine engine heat exchangers. More particularly, the disclosure relates to air-to-air heat exchangers.

Gas turbine engines (used in propulsion and power applications and broadly inclusive of turbojets, turboprops, turbofans, turboshafts, industrial gas turbines, and the like) include a variety of heat exchangers. Examples of gas turbine engine heat exchangers are found in: United States Patent Application Publication 20190170445A1 (the '445 publication), McCaffrey, Jun. 6, 2019, "HIGH TEMPERATURE PLATE FIN HEAT EXCHANGER"; United States Patent Application Publication 20190170455A1 (the '455 publication), McCaffrey, Jun. 6, 2019, "HEAT EXCHANGER BELL MOUTH INLET"; and United States Patent Application Publication 20190212074A1 (the '074 publication), Lockwood et al., Jul. 11, 2019, "METHOD FOR MANUFACTURING A CURVED HEAT EXCHANGER USING WEDGE SHAPED SEGMENTS", the disclosures of which three publications are incorporated by reference in their entireties herein as if set forth at length.

An exemplary positioning of such a heat exchanger provides for the transfer of thermal energy from a flow (heat donor flow) diverted from an engine core flow to a bypass flow (heat recipient flow). For example, air is often diverted from the compressor for purposes such as cooling the turbine or aircraft systems. However, the act of compression heats the air and reduces its cooling effectiveness. Accordingly, the diverted air may be cooled in the heat exchanger to render it more suitable for cooling or other purposes. One particular example draws the heat donor airflow from a diffuser case downstream of the last compressor stage upstream of the combustor. This donor flow transfers heat to a recipient flow which is a portion of the bypass flow. To this end, the heat exchanger may be positioned within a fan duct or other bypass duct. The cooled donor flow is then returned to the engine core (e.g., radially inward through struts) to pass radially inward of the gas path and then be passed rearward for turbine section cooling including the cooling of turbine blades and vanes. The heat exchanger may conform to the bypass duct. The bypass duct is generally annular. Thus, the heat exchanger may occupy a sector of the annulus up to the full annulus.

Other heat exchangers may carry different fluids and be in different locations. For example, instead of rejecting heat to an air flow in a bypass duct, other heat exchangers may absorb heat from a core flow (e.g., as in recuperator use).

U.S. Pat. No. 10,100,740 (the '740 patent, the disclosure of which is incorporated by reference in its entirety herein as if set forth at length), to Thomas, Oct. 16, 2018, "Curved plate/fin heater exchanger", shows attachment of a square wave form fin array to the side of a heat exchanger plate body. For radially-extending plates in a radial array, the wave amplitude progressively increases to accommodate a similar increase in inter-plate spacing.

SUMMARY

One aspect of the disclosure involves a heat exchanger for providing thermal energy transfer between a first flow along a first flowpath and a second flow along a second flowpath. The heat exchanger has: at least one plate bank and a manifold having an inlet plenum and an outlet plenum. The plate bank has a plurality of plates, each plate having: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. The manifold has a first face to which the plurality of plates are mounted along their respective proximal edges. The inlet plenum has at least one inlet port and at least one outlet port. The outlet plenum has at least one outlet port and at least one inlet port. The first flowpath passes from the at least one inlet port of the inlet plenum, through the at least one passageway of each of the plurality of plates, and through the at least one outlet port of the outlet plenum. For each plate, the manifold first face has a respective associated slot capturing a portion of the plate along the proximal edge thereof to prevent extraction of the plate normal to the manifold first face.

A further embodiment of any of the foregoing embodiments may additionally and/or alternatively include said captured portion of the plate being a dovetail having tapering shoulders and a base.

A further embodiment of any of the foregoing embodiments may additionally and/or alternatively include each plate having a mounting ear having an aperture. A respective threaded fastener extends through the aperture.

A further embodiment of any of the foregoing embodiments may additionally and/or alternatively include each slot having a closed first end and an open second end. The fastener is proximate the second end.

A further embodiment of any of the foregoing embodiments may additionally and/or alternatively include the aperture being an open slot.

A further embodiment of any of the foregoing embodiments may additionally and/or alternatively include the fastener having a head flush or subflush to the manifold first face adjacent the slot.

A further embodiment of any of the foregoing embodiments may additionally and/or alternatively include each slot having a closed first end and an open second end.

A further embodiment of any of the foregoing embodiments may additionally and/or alternatively include each slot having a base. Each slot base has a first groove and a second groove. A first seal in the first groove seals the associated plate inlet port to a respective said inlet plenum outlet port. A second seal in the second groove seals the associated plate outlet port to a respective said outlet plenum inlet port.

A further embodiment of any of the foregoing embodiments may additionally and/or alternatively include, for each plate of the plurality of plates, the at least one passageway comprising: an inlet plenum extending from the at least one inlet port of the plate; an outlet plenum extending to the at least one outlet port of the plate; and a plurality of legs fluidically in parallel between the inlet plenum and the outlet plenum.

A further embodiment of any of the foregoing embodiments may additionally and/or alternatively include: one or more reinforcement walls in the inlet plenum; and/or one or more reinforcement walls in the outlet plenum.

A further embodiment of any of the foregoing embodiments may additionally and/or alternatively include the inlet plenum being adjacent the trailing edge and the outlet plenum being adjacent the leading edge.

A further embodiment of any of the foregoing embodiments may additionally and/or alternatively include, in the at least one plate bank, the plates being parallel to each other.

A further embodiment of any of the foregoing embodiments may additionally and/or alternatively include each plate further comprising an external fin array.

A further embodiment of any of the foregoing embodiments may additionally and/or alternatively include respective external fin arrays connecting adjacent said plates.

A further embodiment of any of the foregoing embodiments may additionally and/or alternatively include a gas turbine engine including the heat exchanger.

Another aspect of the disclosure involves a heat exchanger plate for providing heat transfer between a first flow along a first flowpath and a second flow along a second flowpath. The heat exchanger plate comprises: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. The proximal edge is along a mounting rail (e.g., a thickened mounting rail such as a dovetail rail).

A further embodiment of any of the foregoing embodiments may additionally and/or alternatively include the proximal edge extending from a first end to a second end. At the second end, the plate has an apertured mounting ear.

Another aspect of the disclosure involves a heat exchanger plate for providing heat transfer between a first flow along a first flowpath and a second flow along a second flowpath The heat exchanger plate comprises: a first face and a second face opposite the first face; a leading edge along the second flowpath and a trailing edge along the second flowpath; a proximal edge having at least one inlet port along the first flowpath and at least one outlet port along the first flowpath; and at least one passageway along the first flowpath. The proximal edge extends from a first end to a second end. At the second end, the plate has an apertured mounting ear.

A further embodiment of any of the foregoing embodiments may additionally and/or alternatively include at the first end, the plate lacking an apertured mounting ear.

A further embodiment of any of the foregoing embodiments may additionally and/or alternatively include the aperture of the apertured mounting ear being an open-end slot.

Another aspect of the disclosure involves a heat exchanger manifold having: a first face having a plurality of plate mounting slots; an inlet plenum; and an outlet plenum. The inlet plenum has: at least one inlet port; and a plurality of outlet ports, each outlet port along a respective said slot. The outlet plenum has: at least one outlet port; and a plurality of inlet ports, each inlet port along a respective said slot.

A further embodiment of any of the foregoing embodiments may additionally and/or alternatively include the manifold being in a heat exchanger for providing thermal energy transfer between a first flow along a first flowpath and a second flow along a second flowpath. The heat exchanger further comprises: at least one plate bank comprising a plurality of plates. Each plate has: a first face and a second face opposite the first face; a leading edge along the second flowpath and a trailing edge along the second flowpath; a proximal edge, a portion along the proximal edge captured in having mounted to an associated said slot of the manifold first face to prevent extraction of the plate normal to the first face; and at least one passageway along the first flowpath. The first flowpath passes from the at least one inlet port of the inlet plenum, through the at least one passageway of each of the plurality of plates, and through the at least one outlet port of the outlet plenum.

Other aspects of the disclosure may involve methods for manufacturing and/or methods for using the heat exchanger of any of the foregoing embodiments.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 9 is a cutaway view of the manifold along line 9-9 of FIG. 4 with lateral end walls cut away.
FIG. 9A is an enlarged view of an end portion of the manifold of FIG. 9.

Like reference numbers and designations in the various drawings indicate like elements.

DETAILED DESCRIPTION

Figure 1:
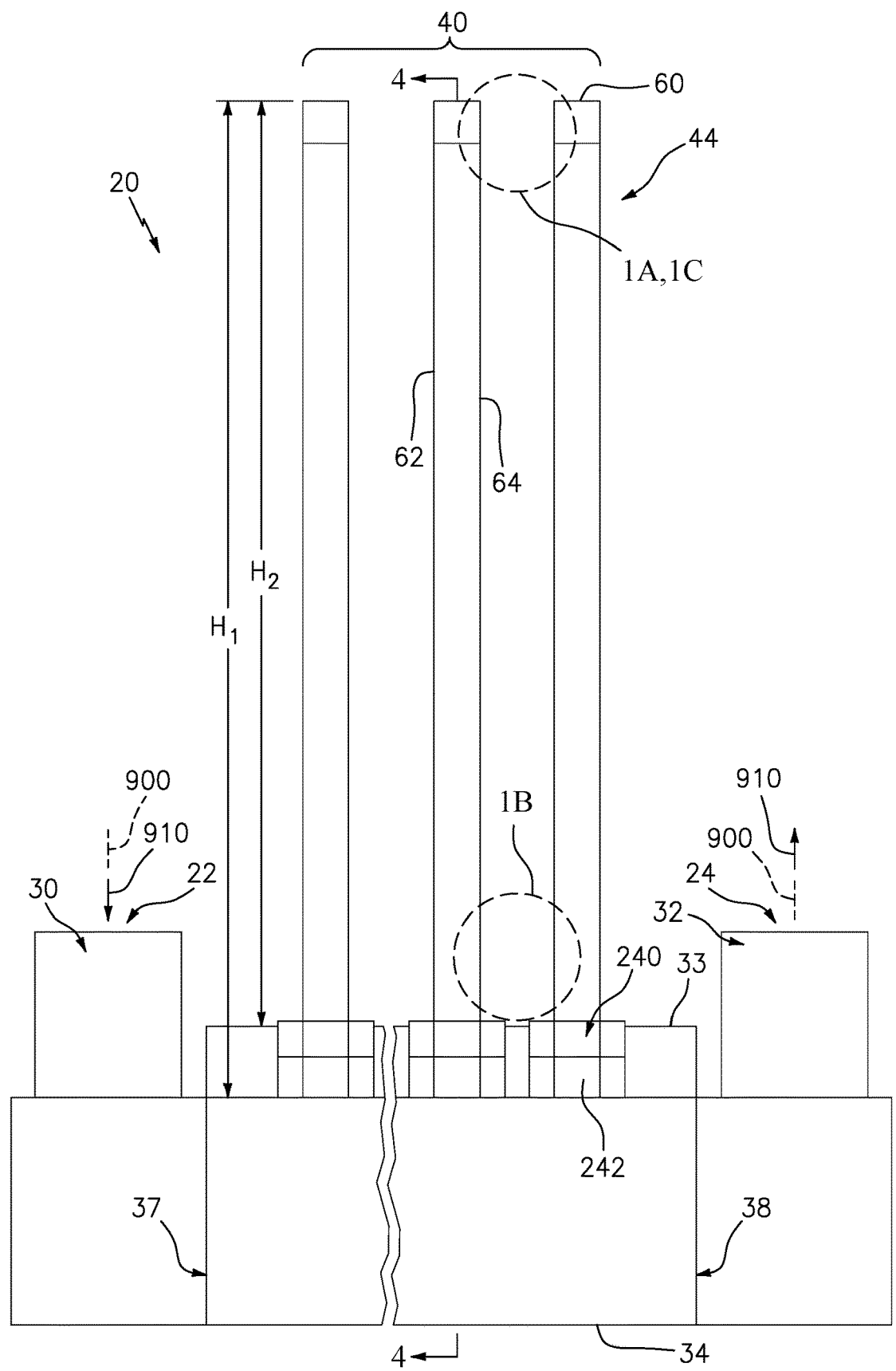
FIG. 1 is a view of a heat exchanger.
Figure 2:
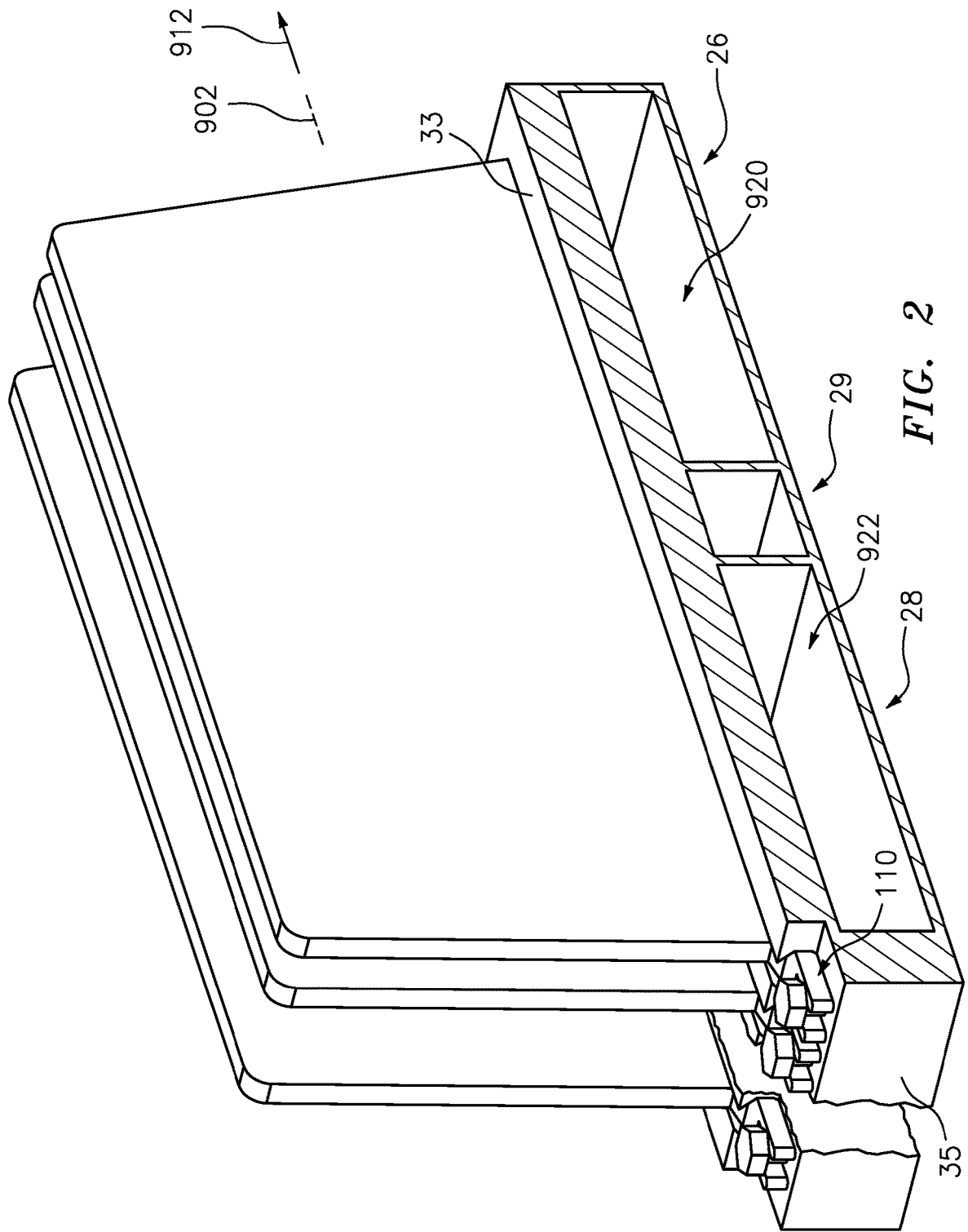
FIG. 2 is a cutaway view of a panel portion of the heat exchanger of FIG. 1 with lateral end walls cut away.
Figure 10:
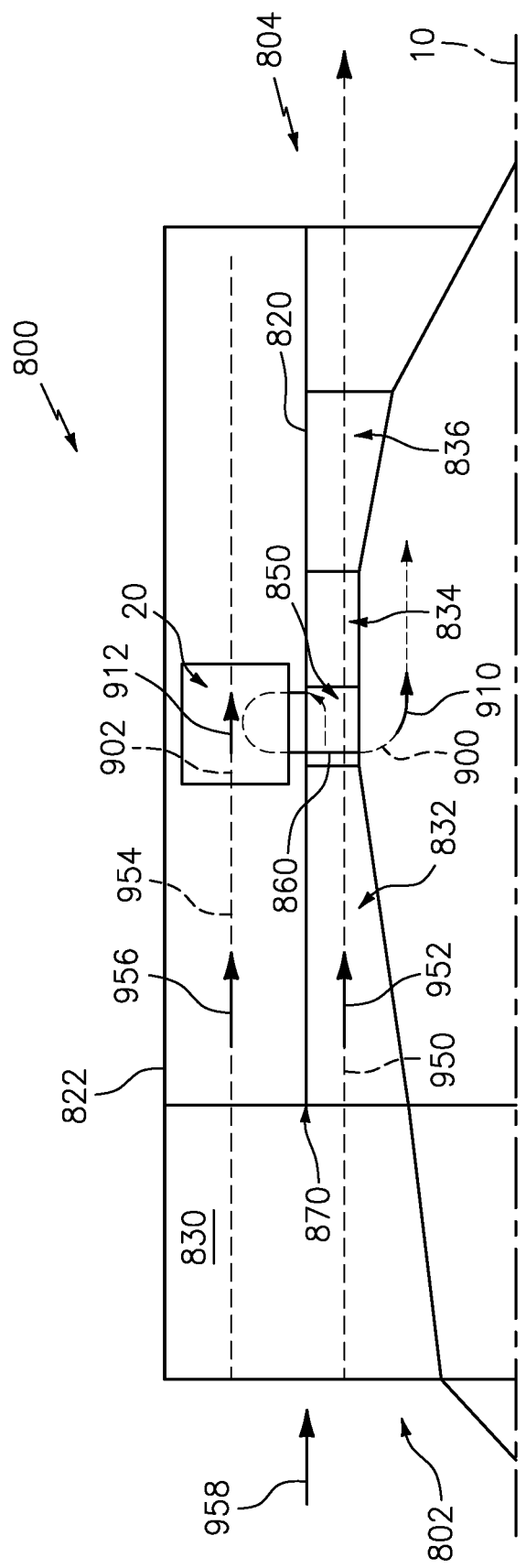
FIG. 10 is a schematic view of a gas turbine engine including the heat exchanger of FIG. 1.

FIG. 1 shows a gas turbine engine heat exchanger 20 providing heat exchange between a first flowpath 900 and a second flowpath 902 (FIG. 2) and thus between their respective first and second fluid flows 910 and 912. In the exemplary embodiment, the flowpaths 900, 902 are gas flowpaths passing respective gas flows 910, 912. In the illustrated example, the first flow 910 enters and exits the heat exchanger 20 as a single piped flow and exits as a single piped flow 910; whereas the flow 912 is a flow through a duct. For example, the flow 912 may be sector portion of an axial annular flow surrounding a central longitudinal axis (centerline) 10 of the heat exchanger and associated engine (FIG. 10). There may be multiple such heat exchangers occupying the full annulus of an annular duct or one or more such heat exchangers occupying only a portion of the annulus.

Other connections are also possible. For example, a configuration with a single first flow inlet and branched first flow outlets is shown in International Patent Application No. PCT/US2020/067289 (the '289 application), filed Dec. 29, 2020 and entitled "Aircraft Heat Exchanger Assembly", the disclosure of which is incorporated by reference herein in its entirety as if set forth at length.

Figure 3:
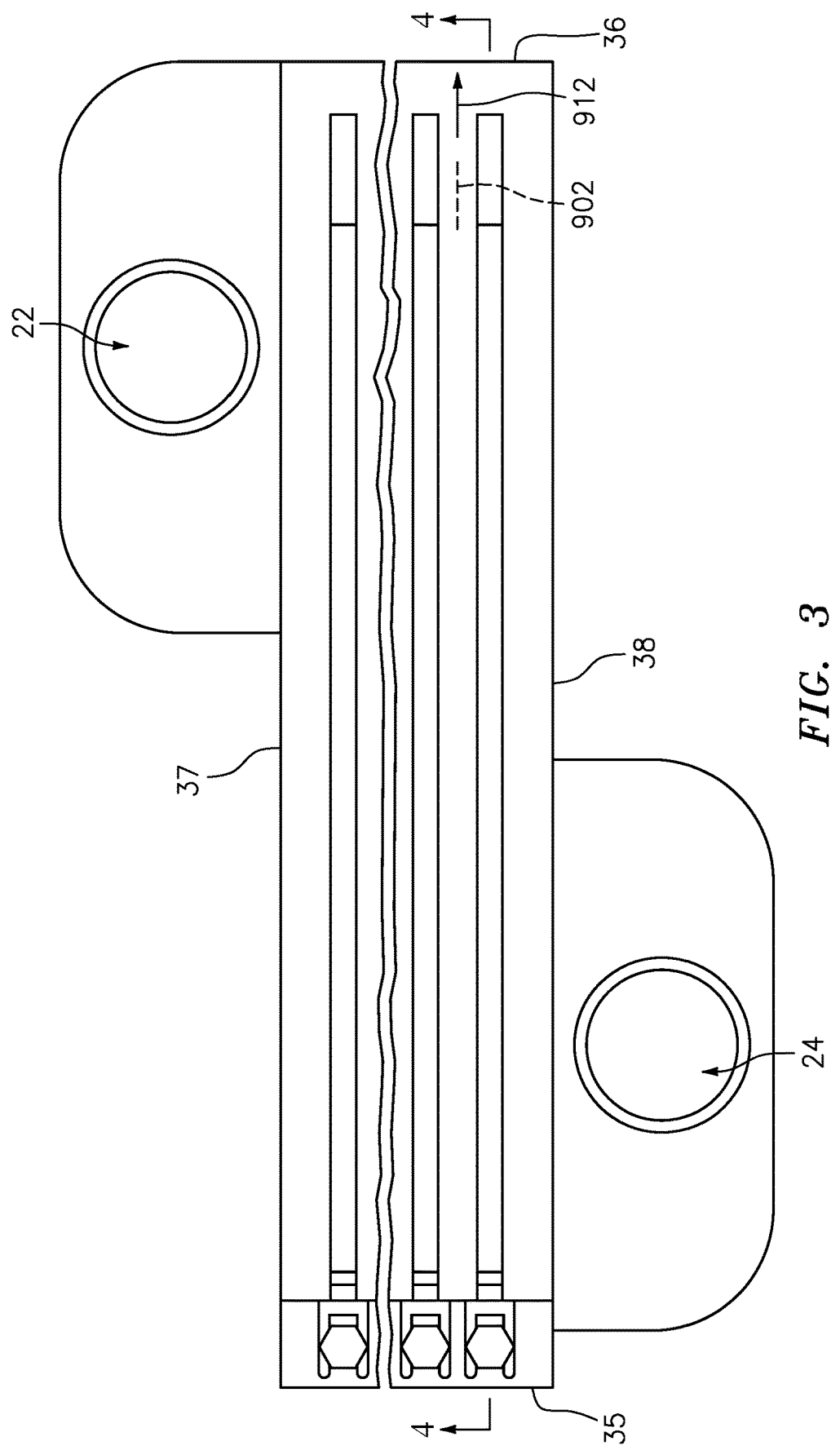
FIG. 3 is a cutaway plan view of the heat exchanger of FIG. 1.

The heat exchanger 20 (FIG. 1) has an inlet 22 and outlet 24 for the first flow. The exemplary inlet and outlet are, respectively, ports of an inlet manifold 26 (FIG. 2) and an outlet manifold 28 (discussed below bounding an inlet plenum 920 and an outlet plenum 922 respectively) that form respective portions of a combined manifold 29. Exemplary manifolds are metallic (e.g., nickel-based superalloy). The inlet manifold and outlet manifold may each have a respective fitting 30, 32 providing the associated port 22, 24. The manifold 29 has a first face 33 (FIG. 1) along the second flowpath 902 and an opposite second face 34. The manifold 29 has a leading/upstream end 35 (FIG. 3) and a trailing/downstream end 36. The manifold 29 has lateral edges/ends 37 and 38. As is discussed further below, the inlet manifold and outlet manifold are coupled to heat exchanger plates of one or more exemplary plate banks 40.

Each plate bank 40 (FIG. 1) comprises an array of plates 44 (discussed further below) mounted to the manifold first face 33. In the exemplary embodiment, the first face is generally flat (as opposed to curved) and the plates are parallel to each other. In a first alternative example (not shown), the first face 33 is concave between the lateral ends 37, 38 and the plates converge away from the first face (e.g., as may be appropriate with the plates extending axially and radially toward the axis of an annular duct. In a second alternative example, the first face 33 is convex between the lateral ends and the plates diverge away from the first face (e.g., as may be appropriate with the plates extending axially and radially out from the axis of an annular duct).

Each plate 44 (FIG. 4) has an inlet port 46 and an outlet port 48. Exemplary ports 46, 48 are mated to ports in the first face 33 of the manifold (a respective outlet port of the inlet manifold and plum and inlet port of the outlet manifold and plenum). Each plate has one or more internal passageways 49 between the ports 46 and 48.

Each plate 44 comprises a body or substrate 52 (e.g., cast or additively manufactured alloy such as nickel-based superalloy) having a leading edge 54, a trailing edge 56, a proximal edge 58, a distal edge 60, a first face 62 (FIG. 1) and a second face 64.

Figure 1A:
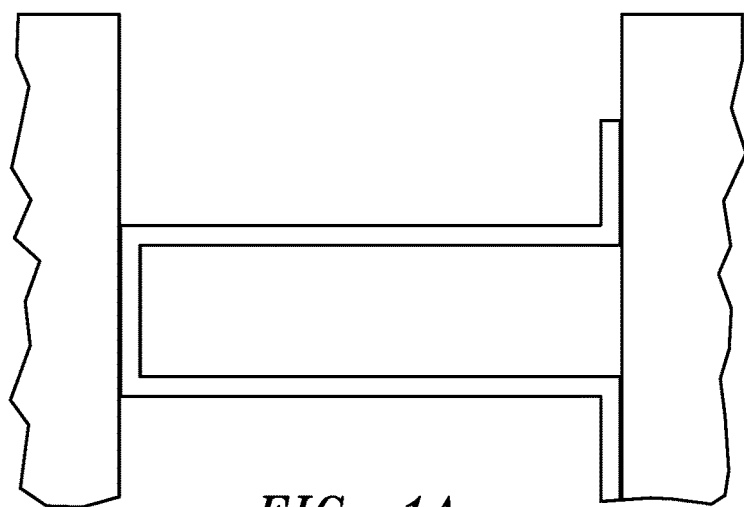
FIGS. 1A and 1B are enlarged views of inter-panel spaces of the heat exchanger of FIG. 1.
Figure 1B:
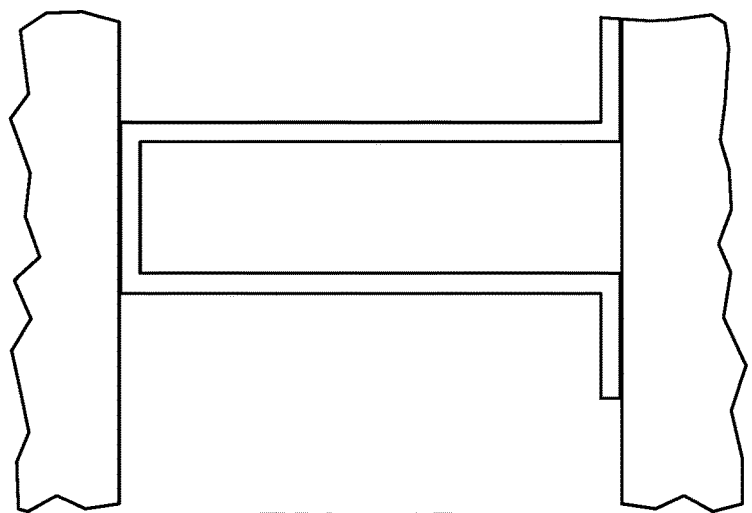

As is discussed below, one or both faces 62, 64 may bear fin arrays 70 (FIGS. 1A and 1B). The fins are separately formed (e.g., of folded sheetmetal—e.g., nickel-based superalloy) and secured (e.g., brazing, welding, diffusion bonding, and the like) to adjacent substrate(s) (generally see the '740 patent). As is discussed further below, exemplary fins are initially formed as square wave corrugations 72 of even height/amplitude whose troughs 73 or peaks 74 are secured to the associated face 62, 64. The corrugation has legs 75, 76 and extends from a first sectional end 77 to a second section end 78. Along the direction of the individual corrugations (streamwise of the ultimate second flow 912) the corrugation has a first end near the plate substrate upstream edge and a second end near the plate substrate downstream edge. FIG. 1 shows the panels having an overall height $H_1$ and an exposed height $H_2$ (which ignores the height of any inlet or outlet fitting portion embedded/received in or adjacent to the manifold). The terminal faces of the terminal plates in the array (the two outer faces at respective ends of the array) may bear fins (not shown) mated to a shroud (not shown) as in the '289 application.

Figure 1C:
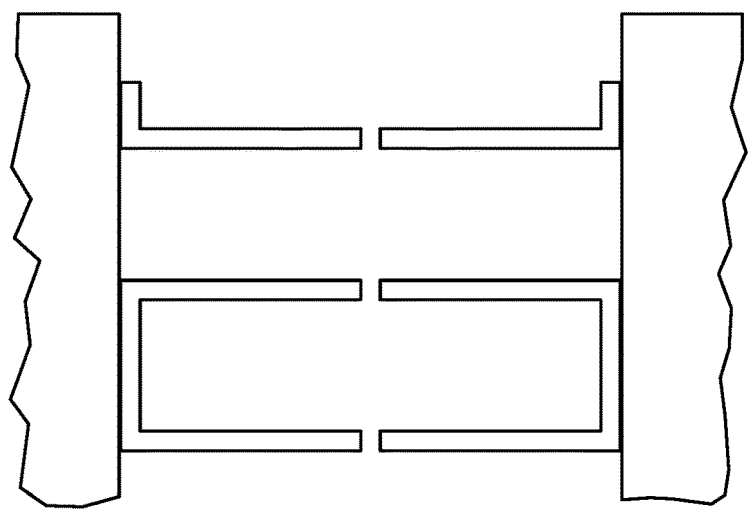
FIG. 1C shows an alternate enlarged view of an inter-panel space.

FIG. 1C shows an alternate plate where adjacent faces of adjacent plates have separate fin arrays. These may be cut from a wave such as via electrodischarge machining (EDM). For example, wire EDM fins are shown in copending U.S. patent application Ser. No. 17/137,946 (the '946 application), filed Dec. 30, 2020, and entitled "Aircraft Heat Exchanger Finned Plate Manufacture", the disclosure of which is incorporated by reference herein in its entirety as if set forth at length. In particular this facilitates plate arrays where adjacent faces are not parallel (e.g., when mounted radially to the convex OD surface of a manifold). Also see copending U.S. patent application Ser. No. 17/124,790 (the '790 application), filed Dec. 17, 2020, and entitled "Aircraft Heat Exchangers and Plates", the disclosure of which is incorporated by reference herein in its entirety as if set forth at length. The '790 application also discussed resonance behavior benefits of the face convergence.

Figure 5:
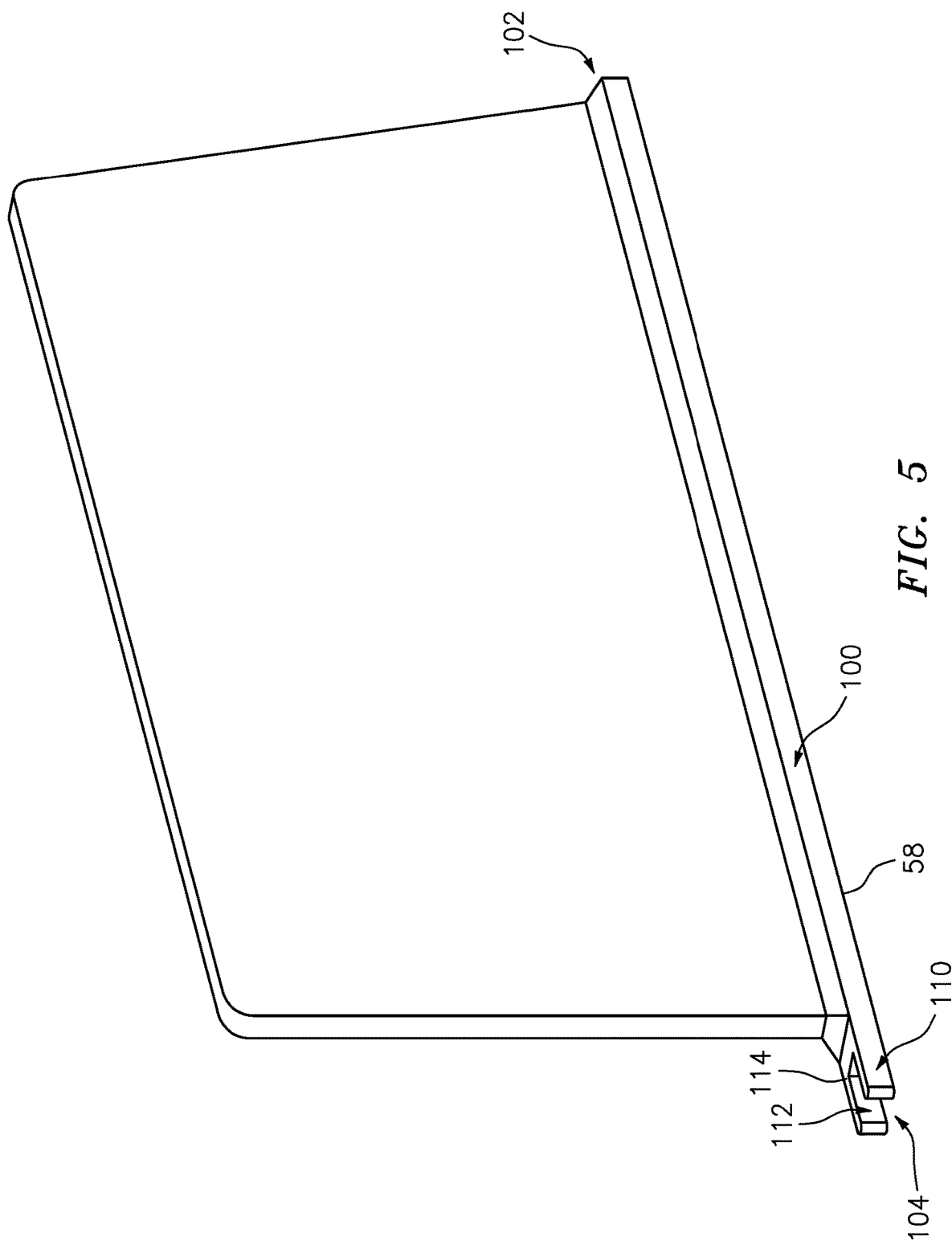
FIG. 5 is a view of a plate of the heat exchanger.

The proximal edge 58 of each plate is formed along a proximal rail structure (rail or mounting rail) 100 (FIG. 5). The rail structure forms a thickened portion that mounts in a complementary slot (discussed below) to prevent extraction of the plate normal to the rail. The rail structure 100 extends from a first end 102 to a second end 104. As is discussed further below, the exemplary second end 104 has an apertured mounting ear 110. The exemplary aperture 112 is an open-end slot between the proximal edge 58 and an outboard surface 114 of the ear.

Figure 6:
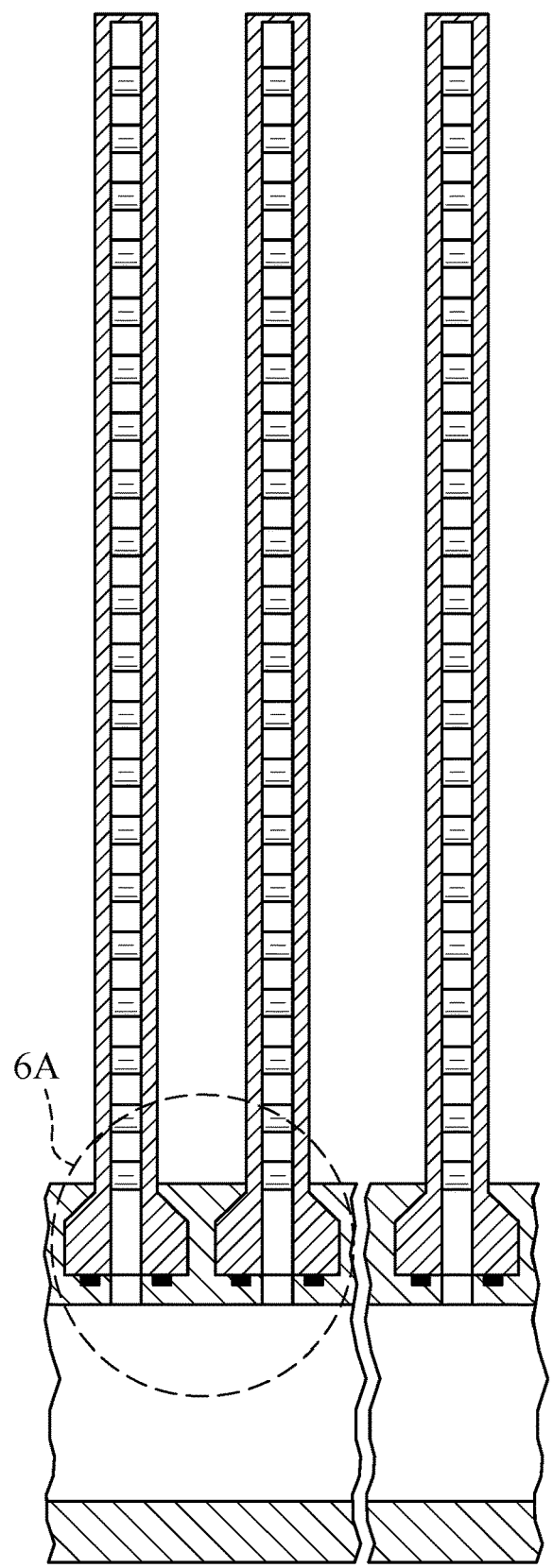
FIG. 6 is a sectional view of a section of the heat exchanger taken along line 6-6 of FIG. 4.
Figure 6A:
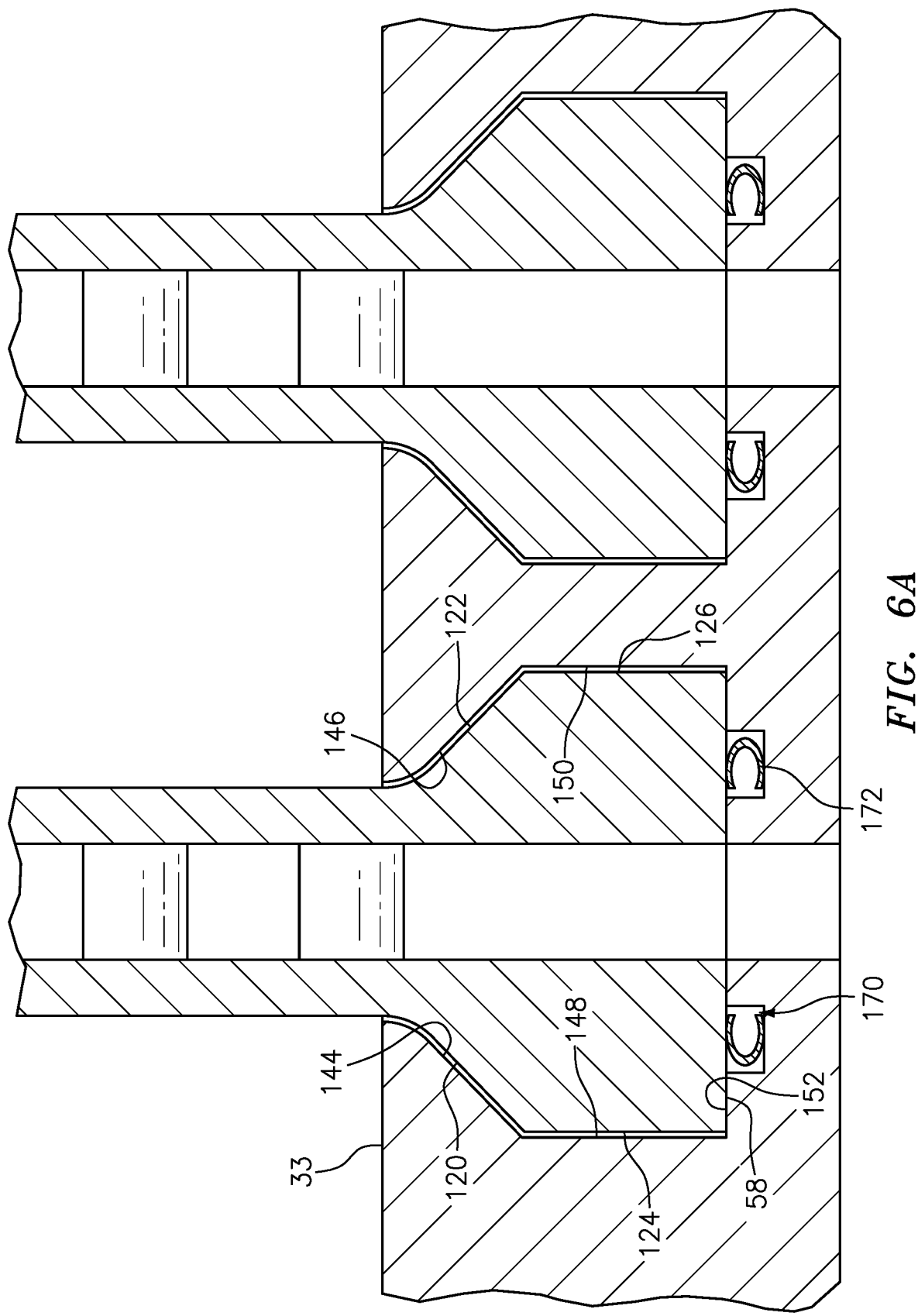
FIG. 6A is an enlarged view of a plate-to-manifold junction of the heat exchanger of FIG. 6.
Figure 7:
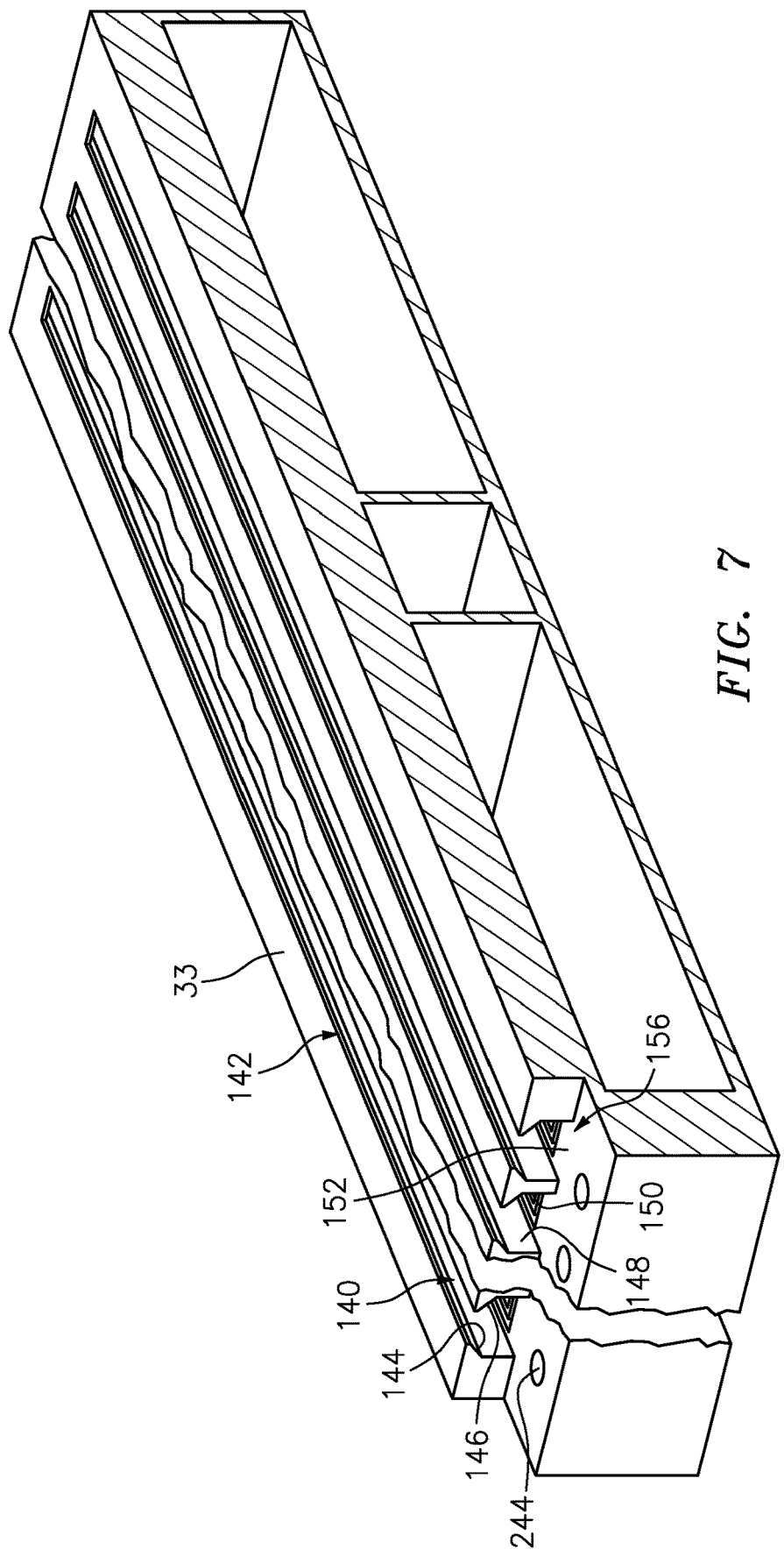
FIG. 7 is a cutaway view of the manifold of the heat exchanger section of FIG. 2.

In transverse section, the rail 100 has a pair of tapering shoulder surfaces 120, 122 (FIG. 6A). The shoulder surfaces extend to parallel side surfaces 124, 126 which, in turn, merge with a base (base surface) formed by the proximal edge 58. As is discussed further below, the exemplary rail effectively is a dovetail rail received in a dovetail slot 140 (FIG. 7). Each slot 140 has an open distal end or mouth 142 at the face 33. Each slot 140 has tapering shoulder surfaces 144, 146 complementary to the rail shoulder surfaces 120, 122. Each slot has side/lateral surfaces 148, 150 complementary to the rail surfaces 124, 126. Each slot has a base surface 152 complementary to the rail base surface or proximal edge 58 and facing and sealed thereto as discussed below. Exemplary slots are machined such as by shaped end mill either fully (machined into a flat surface) or partially (machined from a cast slot precursor such as a right channel).

Figure 8:
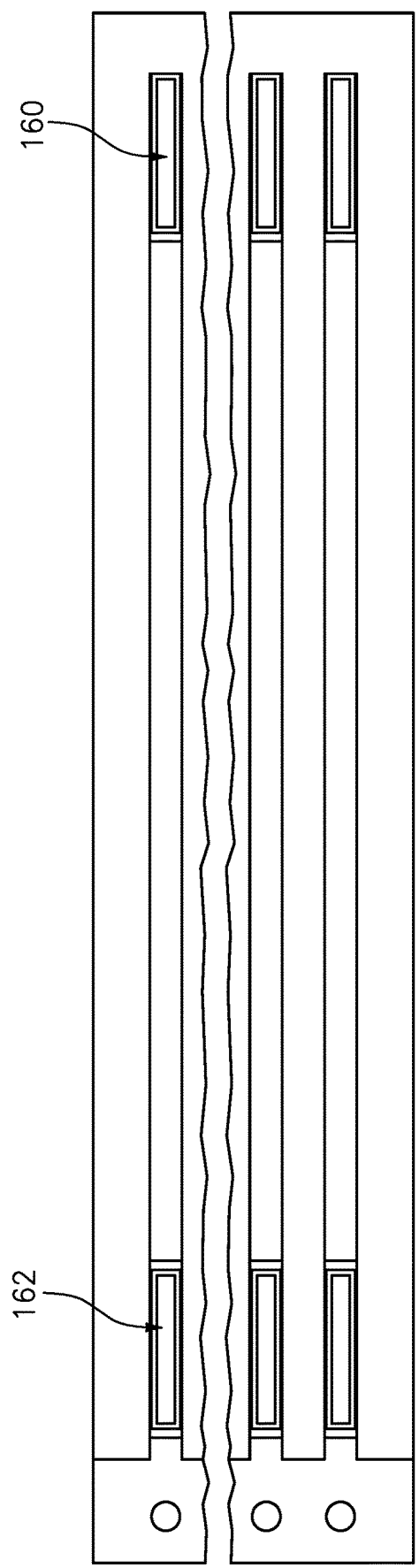
FIG. 8 is a plan view of the manifold section of FIG. 7.

In each slot, there are a pair of ports 160, 162 (FIGS. 8 and 9). The port 160 is an outlet port from the inlet manifold/plenum 26/920 and the port 162 is an inlet port to the outlet manifold/plenum 28/922. These are respectively in adjacent communication and sealed with the associated plate inlet port 46 and outlet port 48 to pass an associated branch of the first flow 910 and first flowpath 900. For sealing, about each port 160, 162 (FIGS. 8 and 9) the slot base 152 includes a groove 170 (FIG. 9A) accommodating respective seal 172. Exemplary grooves 170 and seals 172 have a rounded-corner rectangular footprint. Exemplary seals 172 are self-energized metallic rings (e.g., C-seals) or solid elastomeric rings depending upon operating temperature environment.

Figure 4:
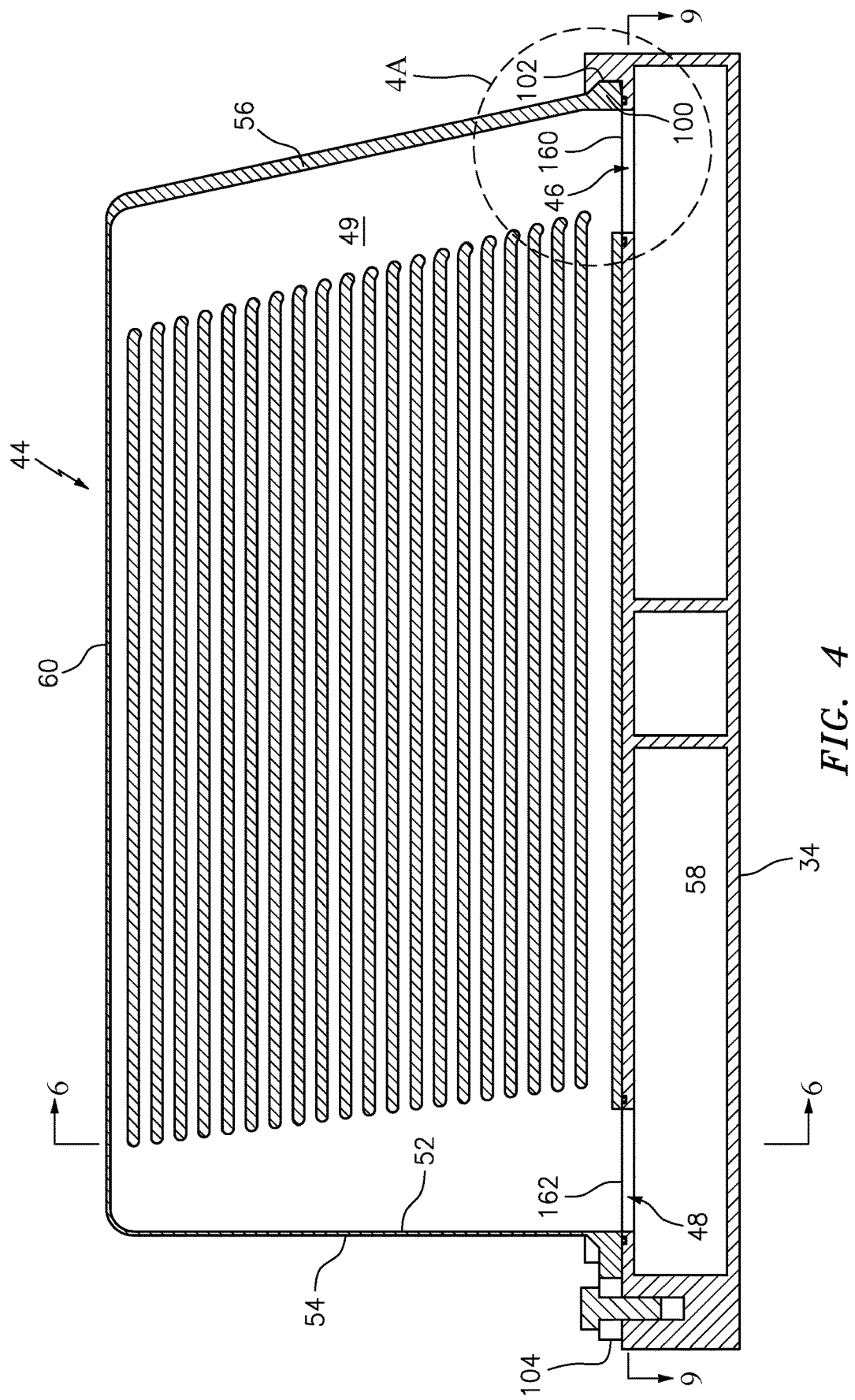
FIG. 4 is a longitudinal sectional view of the heat exchanger taken along line 4-4 of FIG. 3.
Figure 4A:
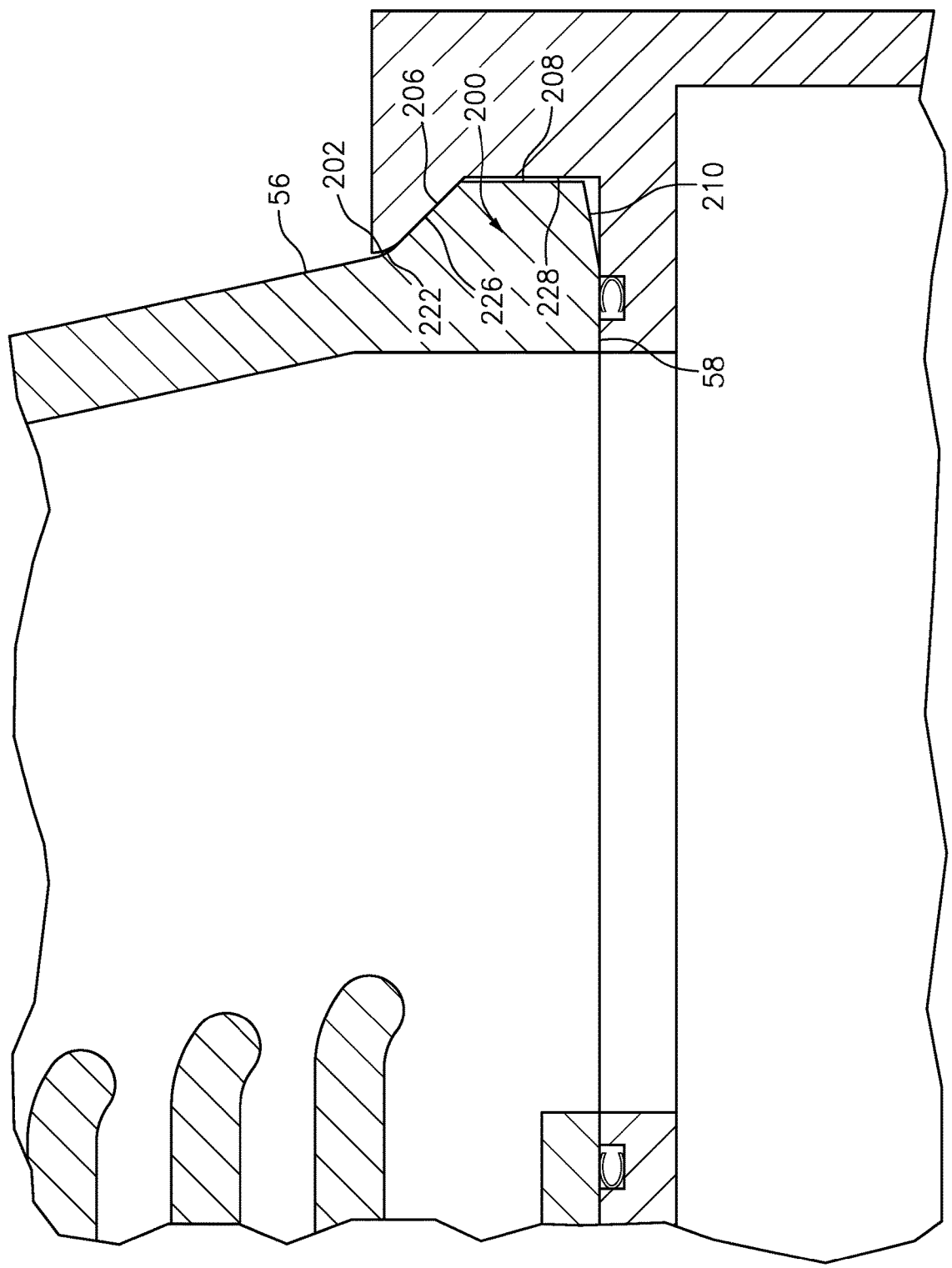
FIG. 4A is an enlarged view of a plate rail end portion of the heat exchanger of FIG. 4.

The exemplary slot 140 has a closed first end 154 (FIG. 7) and an open second end 156. In assembly, the respective individual plates may be installed by sliding their respective rail into the associated slot 140 until the rail is stopped at the slot first end 154. FIG. 4 shows a protruding first end section 200 of the rail 100. In the FIG. 4A sectional view, the portion 200 has an arcuate transition 202 from the trailing edge 56 to an angled or beveled shoulder 206. The shoulder 206 extends therefrom to an end face 208 essentially normal to the main portion of the proximal edge 58. Along the first end portion of the proximal edge 58, there may be a slightly angled ramping transition 210 to aid insertion of the rail 100 into the slot 140. The closed first end of the slot has surfaces 222, 226, and 228 generally complementary to the surfaces 202, 206, and 208 respectively but without need for any angled surface complementary to the ramping surface 210. Upon installation, surfaces 206 and 226 will interface in a wedge-like fashion to hold the plate firmly engaged to the manifold slot base 152 near the rail first end 102.

Once the rail has been slid into place, the rail may be secured against extraction via a fastener 240 (FIG. 1). The exemplary fastener also holds the plate firmly engaged to the manifold slot base at the associated second end 104 of the rail. An exemplary fastener 240 is a threaded fastener having a shaft/shank extending through the mounting ear 110 and into the manifold 29. The exemplary fastener 110 is a bolt (e.g., hex-head) whose shaft 242 is received in a threaded bore 244 (FIG. 7) of the manifold. Thus, after sliding installation of each plate, the associated fastener 240 may be installed and tightened to hold the plate in place. The exemplary installation leaves the bolt head subflush (recessed) to or only slightly proud of the surface 33. Alternatively, a rounded hex head may help to alleviate turbulent flow.

FIG. 10 schematically shows a gas turbine engine 800 as a turbofan engine having a centerline or central longitudinal axis 10 and extending from an upstream end at an inlet 802 to a downstream end at an outlet 804. The exemplary engine schematically includes a core flowpath 950 passing a core flow 952 and a bypass flowpath 954 passing a bypass flow 956. The core flow and bypass flow are initially formed by respective portions of a combined inlet airflow 958 divided at a splitter 870.

A core case or other structure 820 divides the core flowpath from the bypass flowpath. The bypass flowpath is, in turn, surrounded by an outer case 822 which, depending upon implementation, may be a fan case. From upstream to downstream, the engine includes a fan section 830 having one or more fan blade stages, a compressor 832 having one or more sections each having one or more blade stages, a combustor 834 (e.g., annular, can-type, or reverse flow), and a turbine 836 again having one or more sections each having one or more blade stages. For example, many so-called two-spool engines have two compressor sections and two turbine sections with each turbine section driving a respective associated compressor section and a lower pressure downstream turbine section also driving the fan (optionally via a gear reduction). Yet other arrangements are possible.

FIG. 10 shows the heat exchanger 20 positioned in the bypass flowpath so that a portion of the bypass flowpath 954 becomes the second flowpath 902 and a portion of the bypass flow 956 becomes the second airflow 912.

The exemplary first airflow 910 is drawn as a compressed bleed flow from a diffuser case 850 between the compressor 832 and combustor 834 and returned radially inwardly back through the core flowpath 950 via struts 860. Thus, the flowpath 900 is a bleed flowpath branching from the core flowpath.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A heat exchanger plate for providing heat transfer between a first flow along a first flowpath and a second flow along a second flowpath, the heat exchanger plate comprising:
   a first face and a second face opposite the first face;
   a leading edge along the second flowpath and a trailing edge along the second flowpath;
   a proximal edge having at least one inlet port along the first flowpath and at least one outlet port along the first flowpath; and
   at least one passageway along the first flowpath,
wherein:
   the proximal edge is along a mounting rail;
   the mounting rail has a first end and a second end;
   the mounting rail has an angled shoulder at the first end; and
   the mounting rail has an arcuate transition from the trailing edge to the angled shoulder.

2. The heat exchanger plate of claim 1 wherein:
   at the second end, the plate has an apertured mounting ear.

3. The heat exchanger plate of claim 2 wherein:
   the aperture of the apertured mounting ear is an open-end slot.

4. The heat exchanger plate of claim 1 wherein:
   the plate comprises an alloy substrate; and
   a respective separately formed fin array secured to one or both of the first face and the second face.

5. A heat exchanger for providing thermal energy transfer between a first flow along a first flowpath and a second flow along a second flowpath, the heat exchanger comprising:
   at least one plate bank comprising a plurality of plates of claim 1;
   a manifold having:
      a first face to which the plurality of plates are mounted along their respective proximal edges;
      an inlet plenum having at least one inlet port and at least one outlet port; and
      an outlet plenum having at least one outlet port and at least one inlet port, the first flowpath passing from the at least one inlet port of the inlet plenum, through the at least one passageway of each of the plurality of plates, and through the at least one outlet port of the outlet plenum,
wherein:
   for each plate, the manifold first face has a respective associated slot capturing the mounting rail of the associated plate to prevent extraction of the plate normal to the manifold first face.

6. The heat exchanger of claim 5 wherein:
   each slot has a closed first end and an open second end; and
   a respective fastener proximate the second end secures the plate against extraction from the slot.

7. A method for using the heat exchanger plate of claim 1, the method comprising:
   sliding the mounting rail of the plate along the proximal edge thereof into a slot of a manifold.

8. The method of claim 7 wherein, for each said plate:
the mounting rail extends from a first end to a second end; and
during sliding the mounting rail of the plate along the proximal edge thereof into the slot of the manifold, respective surfaces of the mounting rail and manifold at the first end interface in a wedge-like fashion to hold the plate firmly engaged to a base of the manifold slot.

9. A heat exchanger plate for providing heat transfer between a first flow along a first flowpath and a second flow along a second flowpath, the heat exchanger plate comprising:
a first face and a second face opposite the first face;
a leading edge along the second flowpath and a trailing edge along the second flowpath;
a proximal edge having at least one inlet port along the first flowpath and at least one outlet port along the first flowpath; and
at least one passageway along the first flowpath,
wherein:
the proximal edge extends from a first end to a second end; and
at the second end, the plate has an apertured mounting ear.

10. The heat exchanger plate of claim 9 wherein:
at the first end, the plate lacks an apertured mounting ear.

11. The heat exchanger plate of claim 9 wherein:
the aperture of the apertured mounting ear is an open-end slot.

12. The heat exchanger plate of claim 9 wherein:
one or both of the first face and the second face bears a fin array.

13. The heat exchanger plate of claim 9 wherein:
the plate comprises an alloy substrate; and
a respective separately formed fin array is secured to one or both of the first face and the second face.

14. A heat exchanger plate for providing heat transfer between a first flow along a first flowpath and a second flow along a second flowpath, the heat exchanger plate comprising:
a first face and a second face opposite the first face;
a leading edge along the second flowpath and a trailing edge along the second flowpath;
a proximal edge having at least one inlet port along the first flowpath and at least one outlet port along the first flowpath; and
at least one passageway along the first flowpath,
wherein:
the proximal edge is along a mounting rail; and
the mounting rail is a dovetail having tapering shoulders and a base.

15. The heat exchanger plate of claim 14 wherein:
the mounting rail has respective side surfaces between the tapering shoulders and the base.

16. The heat exchanger plate of claim 15 wherein:
the mounting rail side surfaces are parallel to each other.

17. The heat exchanger plate of claim 14 wherein:
the mounting rail has a first end and a second end; and
the mounting rail base has a ramping transition at the first end.

18. A method for using a plurality of heat exchanger plates for providing heat transfer between a first flow along a first flowpath and a second flow along a second flowpath, the heat exchanger plates each comprising:
a first face and a second face opposite the first face;
a leading edge along the second flowpath and a trailing edge along the second flowpath;
a proximal edge having at least one inlet port along the first flowpath and at least one outlet port along the first flowpath; and
at least one passageway along the first flowpath,
wherein:
the proximal edge is along a mounting rail;
the method comprising:
sliding the mounting rail of each plate along the proximal edge thereof into a respective slot of a manifold,
wherein:
each slot has a base;
each slot base has a first groove and a second groove;
a first seal in the first groove seals the associated plate inlet port to a respective said inlet plenum outlet port; and
a second seal in the second groove seals the associated plate outlet port to a respective said outlet plenum inlet port.

19. A heat exchanger for providing thermal energy transfer between a first flow along a first flowpath and a second flow along a second flowpath, the heat exchanger comprising:
at least one plate bank comprising a plurality of plates, each plate comprising
a first face and a second face opposite the first face;
a leading edge along the second flowpath and a trailing edge along the second flowpath;
a proximal edge having at least one inlet port along the first flowpath and at least one outlet port along the first flowpath; and
at least one passageway along the first flowpath; and
a manifold having:
a first face to which the plurality of plates are mounted along their respective proximal edges;
an inlet plenum having at least one inlet port and at least one outlet port; and
an outlet plenum having at least one outlet port and at least one inlet port, the first flowpath passing from the at least one inlet port of the inlet plenum, through the at least one passageway of each of the plurality of plates, and through the at least one outlet port of the outlet plenum,
wherein for each plate:
the proximal edge is along a mounting rail;
the manifold first face has a respective associated slot capturing the mounting rail of the associated plate to prevent extraction of the plate normal to the manifold first face;
the slot has a closed first end and an open second end; and
a respective fastener proximate the second end secures the plate against extraction from the slot.

20. The heat exchanger of claim 19 wherein:
each plate comprises an alloy substrate; and
a respective separately formed fin array secured to one or both of the first face and the second face.

* * * * *